United States Patent [19]

Harwell et al.

[11] Patent Number: 4,664,344
[45] Date of Patent: May 12, 1987

[54] APPARATUS AND METHOD OF CAPTURING AN ORBITING SPACECRAFT

[75] Inventors: William D. Harwell; Dale A. Gardner, both of Houston, Tex.

[73] Assignee: The United States of America as represented by the Administrator of the National Aeronautics and Space Administration, Washington, D.C.

[21] Appl. No.: 796,053

[22] Filed: Nov. 7, 1985

[51] Int. Cl.⁴ .................................................. B64G 1/64
[52] U.S. Cl. ..................................................... 244/161
[58] Field of Search ............ 244/115, 116, 161, 158 R, 244/135 A, 3; 114/250, 249; 294/97, 95, 88, 93, 86.25, 89, 86.28, 86.14, 86.1, 100, 115

[56] References Cited

U.S. PATENT DOCUMENTS

| | | |
|---|---|---|
| 707,246 | 8/1902 | Schmidt . |
| 1,166,284 | 12/1915 | Vroman . |
| 2,365,787 | 12/1944 | Wallace ................................... 85/5 |
| 2,523,519 | 9/1950 | Reeves ................................ 113/102 |
| 2,610,082 | 9/1952 | Hill ......................................... 294/97 |
| 2,662,276 | 12/1953 | Sheaffer ............................... 29/255 |
| 2,789,859 | 4/1957 | Woellner .............................. 294/97 |
| 2,885,010 | 5/1959 | Frost ................................... 166/219 |
| 3,075,800 | 1/1963 | Rowekamp ........................... 294/88 |
| 3,107,209 | 10/1963 | Frisch ............................... 204/193.2 |
| 3,152,830 | 10/1964 | Pounder et al. ................... 294/115 |
| 3,284,125 | 11/1966 | Blaske, Sr. et al. ................. 294/86.25 |
| 3,408,101 | 10/1968 | Savary ............................... 294/86.25 |
| 3,440,139 | 4/1969 | Lapierre ............................... 294/97 |
| 3,465,986 | 9/1969 | Milly ................................ 244/158 R |
| 3,508,723 | 4/1970 | Warren et al. ........................... 244/1 |
| 3,742,807 | 6/1973 | Manning .............................. 85/5 R |
| 3,972,554 | 8/1976 | Trylon ................................... 294/97 |
| 4,018,409 | 4/1977 | Burch et al. ........................ 244/161 |
| 4,032,185 | 6/1977 | Peyton ............................. 294/86.25 |
| 4,173,324 | 11/1979 | Rudmann ........................... 244/161 |
| 4,291,910 | 9/1981 | Maupate ............................. 294/95 |
| 4,588,150 | 5/1986 | Bock et al. ........................ 244/161 |

FOREIGN PATENT DOCUMENTS 685790  1/1953  United Kingdom .................. 294/95

*Primary Examiner*—Galen Barefoot
*Attorney, Agent, or Firm*—Hardie R. Barr; John R. Manning; Edward K. Fein

[57] ABSTRACT

Apparatus and method of capturing an orbiting spacecraft by attaching a grapple fixture. A probe is inserted into an opening, such as a rocket nozzle, in the spacecraft until a stop on the probe mechanism contacts the spacecraft, a lever is actuated releasing a spring loaded rod which moves axially along the probe removing a covering sleeve to expose spring loaded toggle fingers which pivot open engaging the side of the opening. The probe is shortened and tensioned by turning a screw thread, pressing the fingers inside of the opening to compress the spacecraft between the toggle fingers and the stop. A grapple fixture attached to the probe, which is thus secured to the spacecraft, is engaged by appropriate retrieval means such as a remote manipulator arm.

14 Claims, 11 Drawing Figures

U.S. Patent   May 12, 1987   Sheet 1 of 5   4,664,344
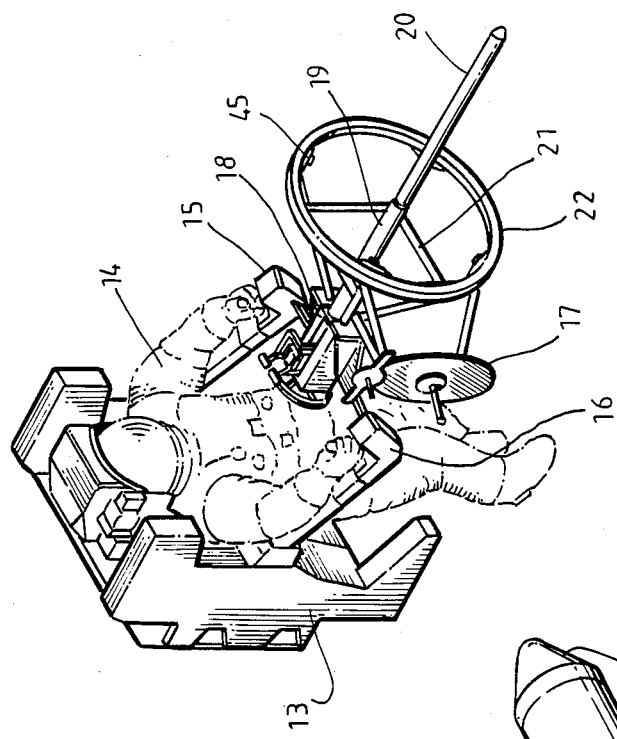
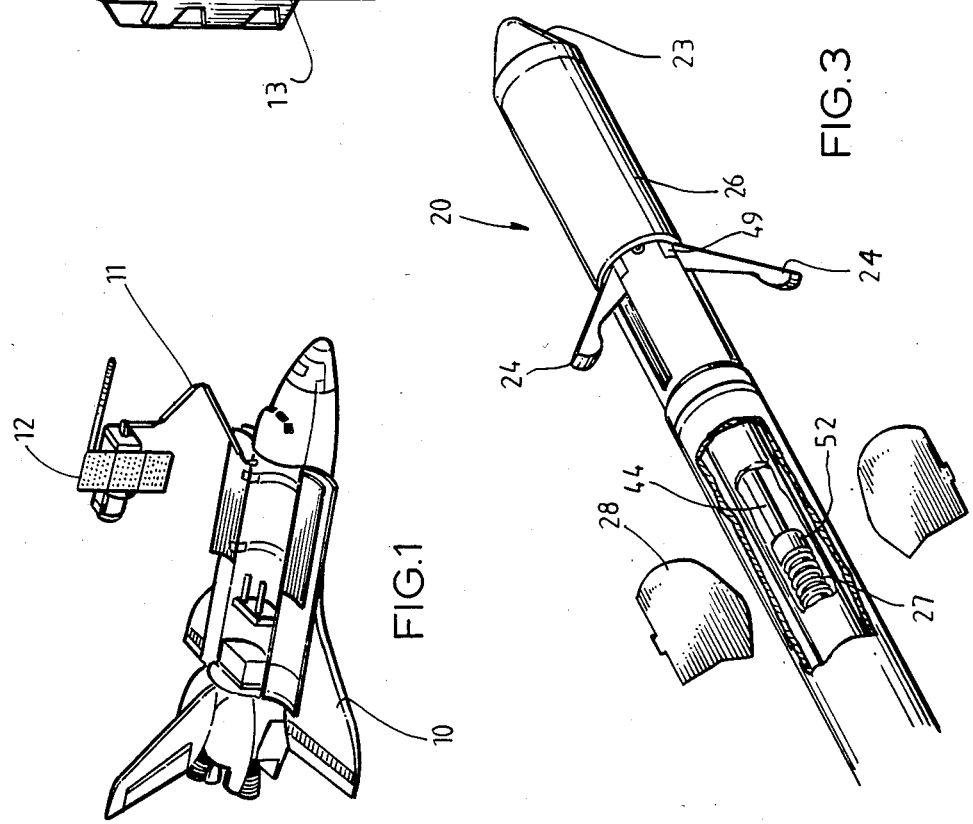

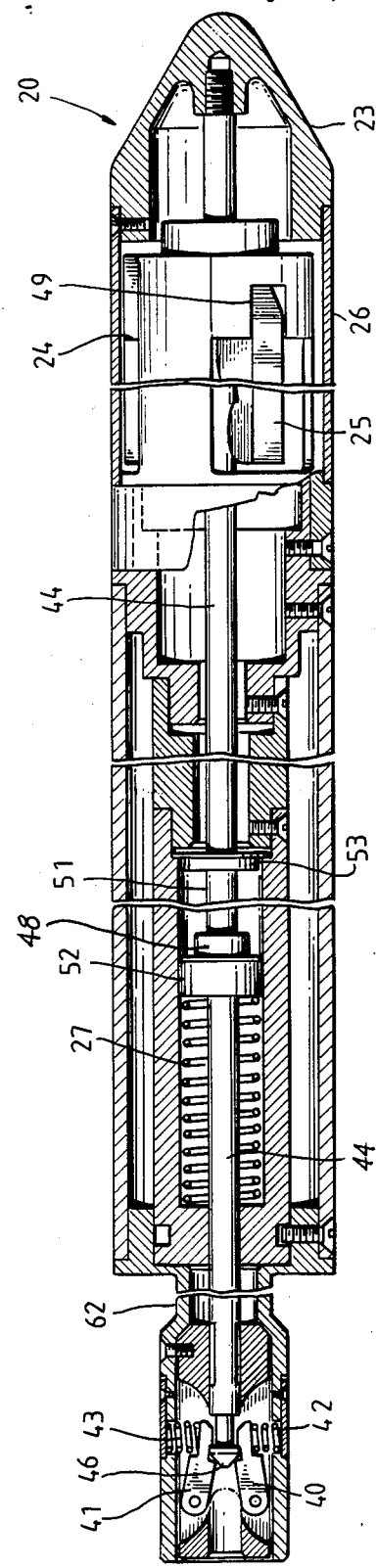
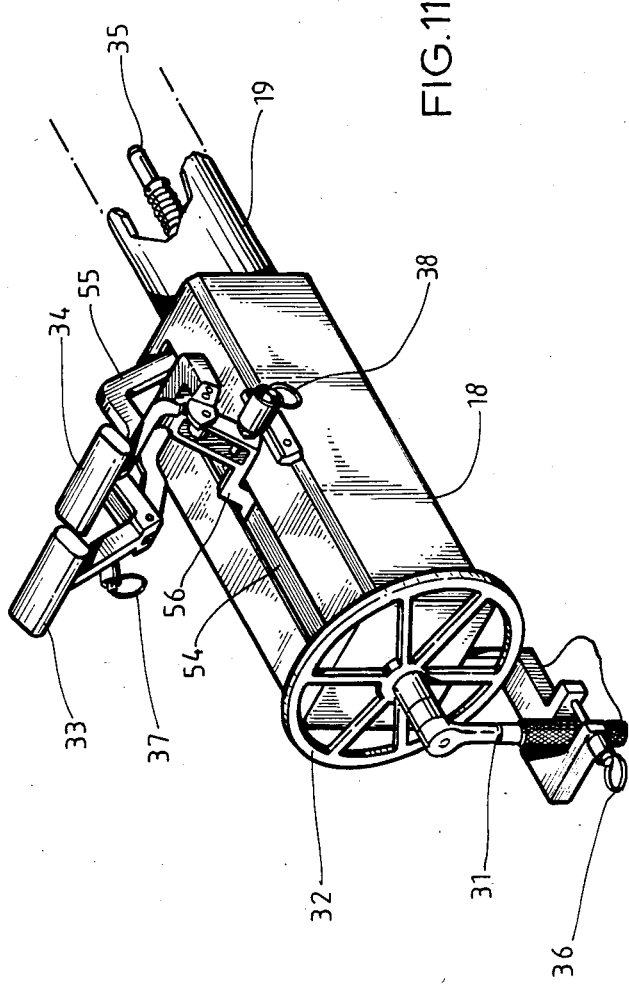
FIG. 4
FIG. 11

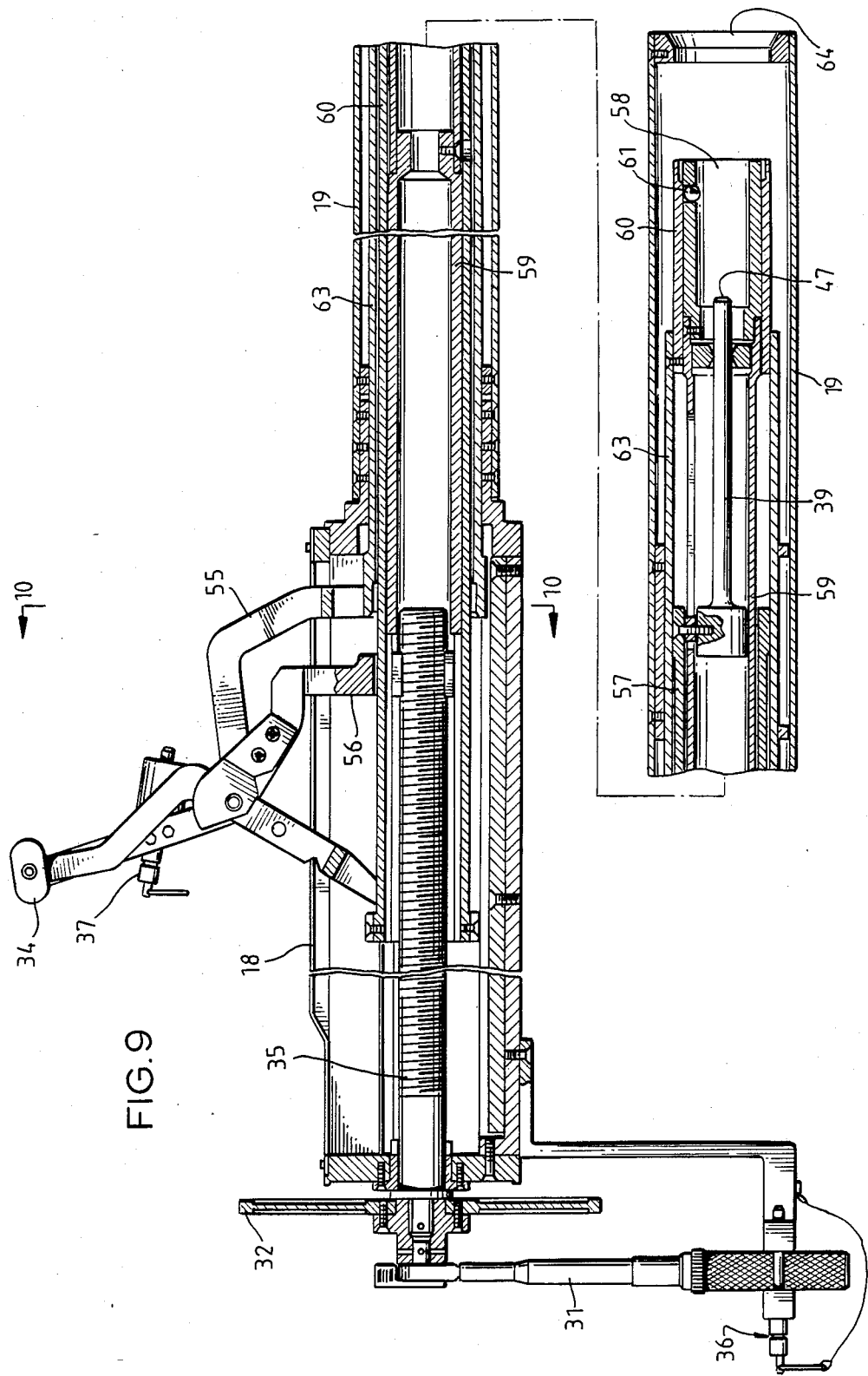

4,664,344

APPARATUS AND METHOD OF CAPTURING AN ORBITING SPACECRAFT

ORIGIN OF THE INVENTION

The invention described herein was made by employees of the United States Government and may be manufactured and used by or for the Government of the United States of America for governmental purposes without payment of any royalties thereon or therefore.

TECHNICAL FIELD

One important Space Shuttle mission is the placement of satellites in Earth orbit. A satellite launched on a previous mission can also be retrieved and returned to Earth for refurbishment and reuse if it is in an accessible orbit or can be moved to an accessible orbit.

A number of individual satellites may be delivered on a single mission. The satellites are serviced, checked, and loaded into the Orbiter. The crew consists of Shuttle pilots and mission and payload specialists. Upon reaching the desired orbit, the mission and payload specialists conduct predeployment checks and operations. After determining that the satellite is ready, the crew operates the payload deployment system, which lifts the satellite from the cargo-bay retention structure, extends it away from the Orbiter, and releases it. The final activation of the satellite is by radio command. The Orbiter stands by until the satellite is performing satisfactorily before proceeding with the remainder of the mission.

To recover a satellite having a grapple fixture, the Orbiter may rendezvous, maneuver close, and engage the satellite with the remote manipulator arm which then lowers it into the cargo bay where it is locked into place. The Orbiter returns the satellite to Earth for repair and reuse.

Major activity is forecast for geosynchronous orbits, deep-space missions, elliptical orbits, and higher circular orbits. Payloads with such destinations will require a propulsion stage in addition to the Shuttle. Both the satellite and the propulsion stage are delivered to orbit and deployed. Before release, the combined propulsion-stage/satellite system is checked and readied, and guidance information is updated. The Orbiter moves a saft distance away before ground control gives radio command signals to fire the propulsion stage engines.

The Orbiter systems are designed to handle various payloads and to support a variety of payload functions. The payload and mission stations on the flight deck provide command and control facilities for payload operations required by the user. Remote-control techniques are employed from the ground when desirable. The crew is able to go into the space environment for Orbiter or payload servicing, deployment, repair, retrieval or inspection tasks, or the crew uses a manipulator arm to handle complete payloads or selected packages.

The manipulator arm, complemented by a television display system, allows the payload operator to transfer experipermental packages and cargo in and out of the Orbiter bay, to place into orbit spacecraft carried up by the Shuttle, and to inspect retrieved orbital spacecraft.

The deployment and retrieval of payloads is sometimes accomplished by using a general purpose remote manipulator system. Payload retrieval involves the combined operations of rendezvous, stationkeeping, and manipulator arm control. One manipulator arm is standard equipment on the Orbiter and is mounted on either the left or right longeron. A second arm may be installed and controlled separately for payloads requiring handling with two arm manipulators. Each arm has remotely controlled television and lights to provide side viewing and depth perception. Lights on booms and side walls provide appropriate illumination levels for tasks that must be performed in the payload bay.

BACKGROUND ART

A vector sensitive latch is described in U.S. Pat. No. 3,820,741 and this latch was used in the Apollo-Soyuz Test Program docking/berthing system. That system incorporated three latches fastened to a docking/berthing ring and automatically released if the mating ring was not fully captured and separated by a set amount. In the fully captured condition, a small clearance between the latch roller and the mating docking/berthing ring was required to ensure that the latch would set. Structural latches were thus provided to remove the clearance and to preload the mating rings in order to prevent separation. Not only was a second set of latches required but in addition means to activate and release the second set of latches thus incorporating additional unnecessary weight and complexity to that particular system.

In a pending U.S. Patent Application by inventor, William R. Acres, assigned to the same assignee as the present case, Ser. No. 783,888, filed Oct. 3, 1985, and entitled "Preloadable Vector Sensitive Latch", there is described a system that relates to a preloadable vector-sensitive latch which automatically releases when the force vector from a latch member reaches a specified release angle. In addition, it contains means to remove clearance between the latched members and to preload the latch to prevent separation at angles less than the specified release angle.

The latching mechanism of that invention overcomes the problem of the prior capture latches in that it is easily released when there is an improper seating because of a novel linking means which creates favorable vector considerations relating to the load and the latch member. These same vector considerations also overcome the problem of releasing a fully seated docking mechanism, in that the load need not be relieved in order to release the latching mechanisms and in fact the presence of a load on that latch member actually facilitates the uncoupling of the docking mechanism.

U.S. Pat. Nos. 2,662,276, 3,075,800, 707,246, and 2,885,010 show rods with pivoting fingers and biasing means for the fingers, which are designed to be inserted within a cylindrical cavity such as a pipe and the like in order to provide means to grasp the pipe from the inside and apply a longitudinal pulling force.

U.S. Pat. Nos. 3,742,807 and 2,365,787 show rods with expandable fingers for inserting into aligned holes within, and maintaining a spaced relationship between adjacent parts.

U.S. Pat. Nos. 1,166,284 and 2,523,519 show fingers that pivot from a rod in order to grasp the inside of a pipe. Both patents show screw actuated means for providing a longitudinal force.

U.S. Pat. Nos. 3,508,723 and 4,018,409 have application to the capturing of spacecraft. The first shows means for locking one spacecraft onto another through the rocket nozzle by means of pivoting locking shoes. The latter shows a docking device in the form of a manipulator arm capable of expanding inside a specially designed docking receptacle.

None of the above references, however, disclose the complete combination herein particularly the use of a traveling sleeve to, first, protect and retain the spring loaded toggle fingers and, second, to release and activate them. Also none teach the rigid attachment of a grapple fixture for retrieving a spacecraft.

DISCLOSURE OF THE INVENTION

This invention relates to apparatus and method of capturing an orbiting spacecraft by attaching a grapple fixture. A probe is inserted into an opening, such as a rocket nozzle, in the spacecraft until a stop ring on the probe mechanism contacts the spacecraft, and a lever is actuated, releasing a spring loaded rod which moves axially along the probe, moving a covering sleeve to expose spring loaded toggle fingers which pivot open inside the motor throat. The probe is then shortened, tensioning it by turning a screw, thus bringing the fingers into contact with the reduced diameter portion of the throat and the spacecraft is compressed between the toggle fingers and the stop ring. A grapple fixture attached to the probe is thus secured to the spacecraft and may be engaged by appropriate retrieval means such as a remote manipulator arm.

The invention also relates to a mechanism that allows an astronaut to grapple a particular satellite while in orbit. Toggle fingers are deployed by torsion springs controlled by an actuator rod and retractor assembly. The toggle subassembly is actuated by a release lever following penetration of the Apogee Kick Motor nozzle throat by the probe. The mechanism may be designed for a certain type of satellite although it can be used for other and similar satellites. Thus, the purpose of the device is to capture in particular a Hughes satellite that has failed to reach a proper orbit. Such craft are captured, and refurbished at a fraction of the cost of building otherwise new satellites. Thus the device herein has specific application to the Hughes HS 376 satellite. This spinning satellite has been successfully captured in space while employing the mechanism and concepts disclosed herein.

The invention further relates to an apparatus for capturing orbiting spacecraft such as satellites and the like comprising a frame structure of rigid construction having at least a pair of extension pieces capable of being attached and detached from a manned maneuvering unit by an astonaut, the frame structure carrying a ring member that acts as a stop member with the satellite to be captured, a control box carried by the frame structure and including a set of hand control elements actuated by the astronaut, a probe received within the control box and being aligned substantially concentrically within the ring member, said probe including at least one toggle type finger assembly capable of roating outward from the probe when actuated by one of said hand control elements by the astronaut, the control box including a rod that moves along the axis of the probe to release the toggle finger when the control element is actuated, a cover sleeve over the probe end and surrounding the toggle finger to protect the finger before such time as the finger is actuated, the control box including means to shorten the probe and to create a compression force between said ring and a portion of the satellite when the apparatus is fixed in the capture mode, a grapple fixture means mounted on the frame structure in order to enable the apparatus and captured satellite to be recovered by a remote manipulator arm on command, at least three of said toggle fingers being on said probe, said fingers being spaced substantially equidistant about the circumference of the probe and being encased within the cover sleeve, the fingers being mounted so as to pivot away from the probe when the cover is removed, first releasing means on the control box for freeing the probe from the control box, a second releasing means on the frame structure for freeing the control box and the probe, a third releasing means for freeing the frame structure, control box, probe, and ring, from the manned maneuvering unit, each of the toggle fingers and the cover release rod of the control box being spring biased, the tension means to shorten the probe including power screw means extending from the control box and with said power screw means being actuatable by a hand wheel located on one end of the control box nearest the astronaut, a torque wrench in cooperating relationship with the hand wheel for applying a predetermined amount of compression between the fingers and the satellite when the apparatus is in the capture mode, and wherein the probe is of a size small enough to fit within the opening of the rocket nozzle of the satellite.

It is another feature of the present invention to provide an apparatus for capturing satellites comprising a manned maneuvering unit having at least a pair of elongated arm support pieces, a rigid frame structure connected to the support pieces of the manned unit, said frame structure including a ring element spaced away from the manned unit, a control box assembly including actuating elements mounted to the frame and having an elongated tube arranged substantially concentrically with the ring, a grapple fixture attached to the frame in order to enable the apparatus to be retrieved, an elongated probe releasably received within the tube of the control box and carrying a plurality of toggle fingers encased in a cover, power screw means carried by the frame for retracting the probe within the tube, torque means cooperating within the power screw means in order to apply a predetermined force to the probe, and means for releasing the control box from the frame and for freeing the manned unit and the frame.

In addition the present invention provides and relates to a method of recovering an orbiting spacecraft such as a satellite and the like comprising the steps of launching an astronaut carrying a manned maneuvering unit and a capture apparatus from a space shuttle at a location closely adjacent the satellite to be recovered, actuating the thrusters on the manned maneuvering unit to position the astronaut in a recovery position with respect to the satellite, attaching the capture apparatus to the satellite, retrieveing the satellite, the astronaut, and the capture apparatus with the remote manipulator arm of the shuttle, the capture apparatus including a grappling fixture, and including means that enable the apparatus to be attached to the rocket nozzle of the satellite, releasing the captured apparatus from the satellite once on board the shuttle, and then releasing the manned unit from the capture apparatus.

The latch mechanism of the present invention is also particularly well adapted for use in "inner" space, i.e., underwater exploration and development, since many of the same considerations such as the simple and "fail-safe" nature of the mechanism and the universal adaptability of the mechanism are important. Additionally, the present mechanism will be useful in such sensitive operations as air-to-air refueling.

Although the present invention in regard to the mechanism and associated mechanisms have been described with regard to a utilization in space for the capturing of spacecraft, or in relation to free and independently movable objects, it is to be understood that the present invention has other utilities.

These and other advantages of the present mechanism will be apparent from the drawings and the description of the invention.

BRIEF DESCRIPTION OF DRAWINGS

FIG. 1 is an isometric view of the space shuttle with the manipulator arm in the capture mode for a satellite.

FIG. 2 shows a crewman with a backpack and the capture device of the present invention.

FIG. 3 is a view of the toggle assembly expanded inside of the satellite.

FIG. 4 is a detailed view of the toggle assembly.

FIG. 9 is a detailed view of the control box mechanism.

FIG. 11 is an isometric view of a portion of the control box of FIG. 9.

BEST MODE FOR CARRYING OUT THE INVENTION

Figure 8:
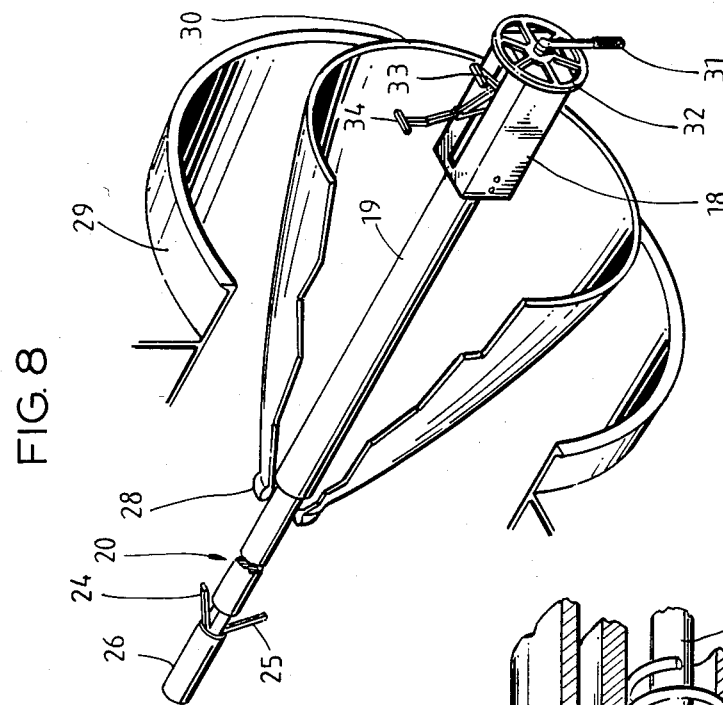
FIG. 8 shows a satellite portion after a disconnect malfunction.

The purpose of the Capture Device is to provide a technique for a crewman to capture one of the Hughes Aircraft Company HS376 satellites in space. This system was successfully used in conjunction with the Space Transportation System Orbiter and the Manned Maneuvering Unit on Mission STS51A. Specifically, the device utilizes the spent Apogee Kick Motor nozzle throat and the Payload Assist Module separation ring on the satellite to apply a clamping force to permit handling of the satellite with the Remote Manipulator System.

Previously, the only attempt to capture a satellite in space was made by NASA in April of 1984 during mission STS41C, the Solar Max Repair Mission. The device used was a Trunnion Pin Attachment Device to install a grapple fixture on the satellite for capture and handling. Attempts to modify that device for use on Hughes satellites have been made but it was found that no structure on the satellite exterior could withstand the potential handling loads. Such previous device was developed specifically for the Solar Max Satellite and its disadvantage for use on HS376 satellites is due to the different satellite configurations.

The present device comprises four major components: a toggle subassembly, control box and retractor assembly, support structure, and a grapple fixture. The toggle subassembly houses the mechanisms and components necessary to simultaneously extend three independently biased toggle fingers with an actuator rod in the control box. A debris cover designed to aid the penetration of the nozzle throat contains the toggle fingers prior to deployment and protects the toggle finger section from debris contamination during throat penetration. The debris cover is deployed by the same motion of the actuator rod that deploys the fingers. The toggle subassembly also has a rotating interface which mechanically locks to the retractor assembly and is operated from the control box with a separation lever.

The control box and retractor assembly contain mechanisms to perform three main functions that of toggle deployment, load application, and the toggle subassembly separation. In the procedure for satellite capture, the crewman in the back pack and with the capture device flies out to the spacecraft. The target is the motor nozzle throat of the satellite which is approximately 3 inches in diameter and must be aligned with the capture device. Penetration of the throat continues until indicator stripes on the toggle subassembly enter the throat. At this point, the crewman pulls the toggle release lever. The lever motion pushes the actuator rod forward which opens the debris cover and permits the toggle fingers to deploy. Finger deployment is verified by completing the rotation of the toggle release lever. Should the lever not rotate fully, this indicates that the fingers did not deploy. By applying more force to the lever, the crewman overcomes whatever binding has occured to thus manually open the debris cover. Once the debris cover opens the fingers deploy independently by means of torsion springs. Any single finger is capable of withstanding the handling loads and therefore a triple failure must occur to prevent capture.

If the crewman releases the toggle fingers premaaturely the torsion springs are such that thrusters on the back pack force them closed by thrusting forward pushing the fingers against the throat wall. The fingers thus then spring open again once inside the throat. When deployed the clearance between the throat and the fingers is eliminated by rotating a speed disc on the back of the control box. This rotation engages threads on the control box power screw to retract the toggle subassembly and force a compressive load between the throat and the separation ring. The final load application is accomplished by a torque wrench connected to the screw of the speed disc until the wrench breaks over indicating an adequate clamping force between the throat and separation ring of the satellite. The crewman then stabilizes the spacecraft using the backpack thrusters. The operator of the manipulator arm grapples the satellite/crewman combination and brings the unit into the payload bay for berthing.

At the appropriate time, the astronaut separates himself from the spacecraft. This is accomplished by pulling a safety pip-pin and by pushing the separation lever forward. The toggle subassembly is disengaged and the crewman flies backwards with the thrusters leaving the toggle subassembly captured inside the nozzle. If binding occurs at the separation interface the torque wrench is operated to force the release of the toggle subassembly. In the event of a malfunction a double bolt interface between the control box and support structure permits release of the control box and retractor assembly from the support structure. Once released the crewman restows the remaining capture structure while another crewman completes the berthing procedures.

The preferred grapple fixture is a modified SPAR Aerospace Limited grapple fixture which is standard for remote grappling. The support structure contains a double-pin interface for the back pack attachment, a double bolt releasable interface for the control box, a 41-inch diameter ring and shoe configuration for the satellite separation ring interface, and a mounting surface for the SPAR grapple fixture.

In FIG. 1, there will be seen what may be described as the ideal situation wherein the space shuttle 10 locates itself closely adjacent the spacecraft 12 to be captured and locks onto the satellite 12 by means of the remote manipulator arm 11. In some instances however the spacecraft to be recovered may not possess a grapple fixture 17 as does that depicted in FIG. 1, for the arm to lock onto and therefore there exists no realistic procedure for capture in such a case short of installing a grappling fixture.

Such grapple fixture installation is depicted in FIG. 2 wherein there will be seen a crewman 14 of shuttle 10 strapped into manned maneuvering unit 13. Unit 13 includes a pair of arm rests 15 and 16 to which is releasably attached frame 21 of the capture apparatus. The attachment of the frame to unit 13 enables the unit 13 to carry the load rather than the astronaut.

Frame 21 includes a grapple fixture 17 and a ring member 22. A probe 20 is located within the ring and the probe is releasably received within tube 19 of control box 18. Control box 18 otherwise includes a pair of control levers 33 and 34 as seen in FIG. 8 and 11 in more detail. Lever 34 releases the toggle fingers as shown in FIGS. 3 and 8, whereas lever 33 causes probe 20 to separate from tube 19.

With reference to FIG. 3, the activated probe will be seen at 20 to include a nose plug 23 to direct the probe into the rocket nozzle throat 28 of the satellite. Three fingers 24 are released when cover 26 is actuated to move away from spring 27 which biases the cover normally open. The function of cover 26 is to protect the fingers 24 prior to being actuated open in order to prevent contaminate particles from forming on the mechanism which could keep the fingers from extending to their open position.

Figure 5:
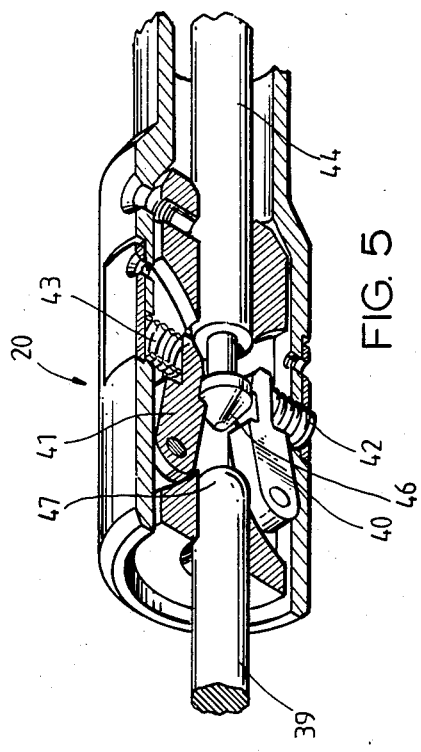
FIG. 5 is a view of a portion of the toggle assembly before the fingers are actuated.
Figure 6:
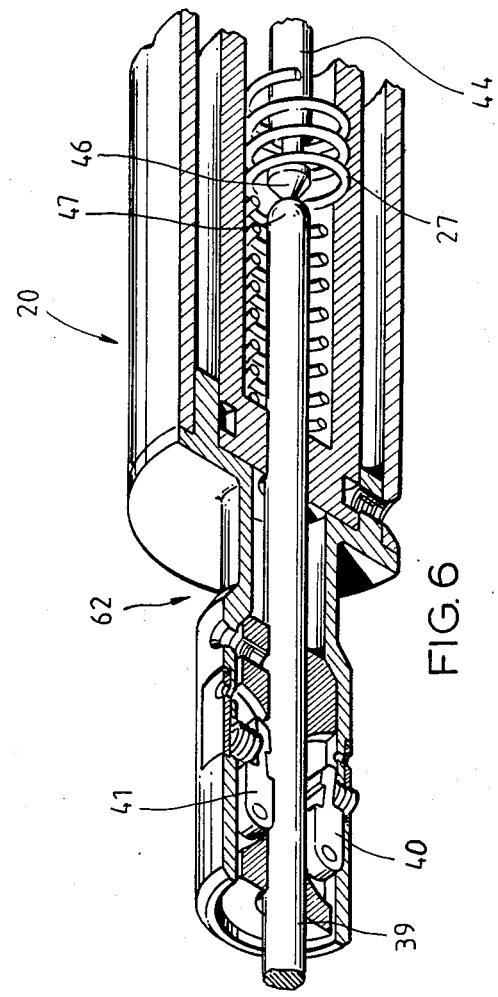
FIG. 6 is a view of a portion of the toggle assembly after the fingers have been actuated.

FIGS. 5 and 6 show the inlet end of the probe 20 in its unactivated and activated positions respectively. For example, in FIG. 5, before the probe is activated open as in FIG. 3 a rod 39 of the control box 18 rests at the entrance of a pair of latches 40 and 41 which are biased by springs 42 and 43. When the probe is activated however, rod 39 is triggered to enter probe 20 and contacts inclined ramp surfaces of latches 40 and 41 pivoting them open, releasing rod 44 of the probe which is biased to move to the right as seen in FIG. 6. Thus, the control box actuator rod 39 opens the latches which hold the probe cover release rod 44. Actuator rod 39 also acts redundantly as a ram to force probe cover release rod 44 to actuate should binding thereof occur.

Figure 7:
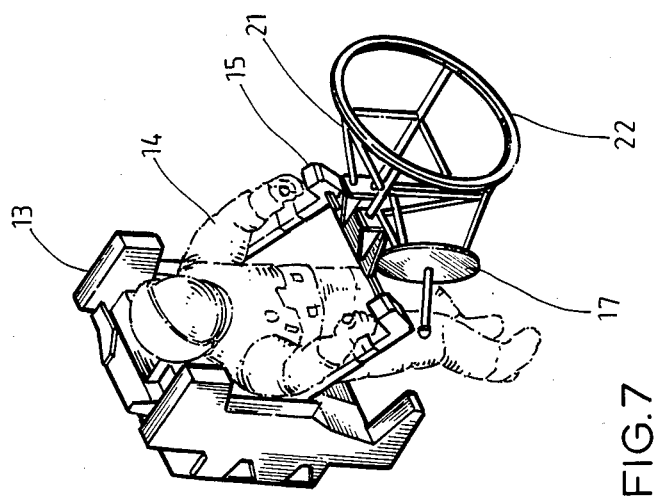
FIG. 7 shows the crewman after a disconnect malfunction.

In FIG. 7, the crewman is shown on board the shuttle and being separated from the satellite in FIG. 8. Normally, it is preferred to release the probe 20 from tube 19 leaving the probe 20 inside of nozzle 30. However, in the even that lever 33 fails to function then the control box 18 may be unbolted from frame 21 to release the whole assembly as seen in FIG. 8. The crewman thereupon withdraws as in FIG. 7 whereupon the unit 13 together with the frame 21 may be removed. The satellite indicated by nozzle 30 and ring 29 is then refurbished on board or returned with the shuttle. Hand wheel 32 and torque wrench 31 are loosened to relieve the compression between the ring 22, fingers 24, and throat 28. To place the ring 22 and the the motor throat 28 in compression, wheel 32 is revolved until probe 20 is shortened by screw 35 to press fingers 24 against throat 28. A predetermined torque may then be applied via wrench 31 to hold the system in place. The wrench 31 is kept in place prior to its use by a lock 36 seen in FIG. 11. Lock 37 also prevents lever 33 of the control box 18 from being actuated accidentally. (Locks 34 and 36 are launch locks only.)

In operation, the crewman is suited up as seen in FIG. 2 and flies out of shuttle 10 to craft 12. Probe 20 is inserted into throat 28 of the craft 12 and lever 34 is actuated to deploy finger 24 as seen in FIG. 3. The crewman then turns hand wheel 32 to shorten the probe 20 and draw it into tube 19 until fingers 24 contact throat 28 which brings ring 22 against separation ring 29. The lock 36 is removed in FIG. 11 and wrench 31 is torqued to press ring 22 and separation ring 29 together. Arm 11 is then attached to grapple 17 and the crewman 14, satellite 12, unit 13, and apparatus 21 are returned to shuttle 10. Once in the shuttle, pin 37 is removed and lever 33 is pushed to release probe 20 from tube 19. If the release malfunctions, box 18 is removed from frame 21 as seen in FIG. 8. Other crewmen then assist the astronaut 14 out of unit 13 and apparatus 21. While a pair of fingers 24 are illustrated, three such fingers are preferred, and the system will function properly if any one of these fingers is deployed. Should the fingers be deployed before the nose plug 23 enters the throat 28, the fingers will collapse against the bias along probe 20 to enable the nose of the probe to pass into the satellite nozzle throat 28. Once inside throat 28, the fingers will redeploy as seen in FIG. 3. However, as noted above, once the fingers deploy as seen in FIGS. 3 and 8, no means has been provided to retract the probe 20 from the throat 28 of the satellite. the particulars of the probe and control box will now be seen with reference to FIGS. 4 and 9-10.

With reference again to FIG. 2, is should be noted that the ring 22 may be provided with a plurality of pad members such as seen at 45 in order to establish a cushion between the ring and the separation ring 29 when those elements are drawn together with hand wheel 32 and wrench 31. The pads 45 may be biased as with springs or washers of the Bellville type, and can be constructed of a friction like material in order to act as a brake mechanism in the event that the satellite is spinning excessively. In such a case, the astronaut 14 utilizes the thrusters of unit 13 in addition in order to counterbalance the turning moment created in the event that the spin is excessive.

The details of the probe 20 are set forth in FIGS. 4, 5, and 6 and the probe will be seen to include, in addition to those elements hereinbefore mentioned, rod tip 46 which functions to hold rod 44 in latches 40 and 41 until latches 40 and 41 are forced open against the force of springs 42 and 43 by the actuator rod 39 of FIG. 5. Thus, the tip 47 of the rod 39 acts to release tip 46 from the latches 40 and 41 to thereby allow the rod 44 to move to the right as seen in FIG. 6 because of spring 27 and cover spring element 48 attached to rod 44 cooperating therewith. The rod 44 in turn slides cover 26 away from fingers 24 which allows the fingers to pivot at 49 to thereby produce the configurations shown in FIGS. 3 and 8. The driving force applied to rod tip 46 by tip 47 of the rod 39 is transmitted from the tip 46 through rod 44 to cover 26 acting inside bushing/guide 52 and bushing 53. Spring 27 is biased against movable bushing/guide 52. Springs 42 an d43 maintain the latches 40 and 41 biased about tip 46 to hold cover 26 closed until activated by the tip 47 of rod 39.

Figure 10:
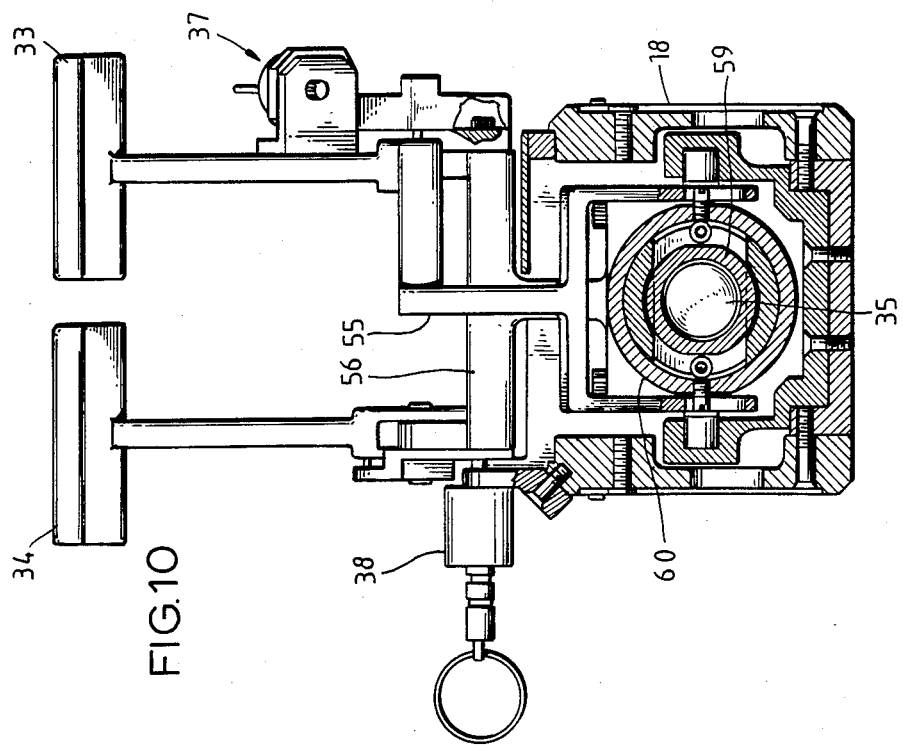
FIG. 10 is a view of a portion of the control box of FIG. 9 taken along line 10—10.

With reference now to FIGS. 9-11, the control box 18 is illustrated in more or less detail and will be seen to include a control box lever guideway slot 54 which enables the lever arms 55 and 56 from hand control levers 33 and 34 to function within the interior of the control box assembly 18. In order to trigger the finger assembly 24 to open, the lever 34 is actuated which forces rod 39 to the right as seen in FIG. 9. This action opens latches 40 and 41 and pushes tip 47 against tip 46 of rod 44 of the probe as noted above. The motion of lever 34 to trigger the tip assemblies 46 and 47 is transmitted from the hand lever 34 to the rod tip 47 by way of cylinder sleeve 57 which moves to the right in FIG. 9 to thereby force rod 39 and tip 47 against tip end 46 of probe 20 which is received in chamber 58 of the tube assembly 19.

Once the fingers 24 of the probe have been actuated open by lever 34, hand wheel 32 is turned which rotates power screw 35 to thereby move the chamber 58 along with the probe to the left as seen in FIG. 9. Power screw 35 slides the cylinder sleeve 59 to the left in FIG. 9 to draw the fingers into contact with the satellite nozzle throat 28. A firm connection is then achieved by using wrench 31 instead of wheel 32 to apply a load between fingers 24, throat 28, and rings 22 and 29. Lock 36 is removed prior to use of the wrench 31.

In order to release the probe 20 from the chamber 58 and from the tube 19 of the control box 18, the lever 33 is actuated which slides tube 60 to the left as seen in FIG. 9. This movement of tube 60 frees three ball bearings 61 from notch 62 (FIG. 4) whereby the connection between the tube assembly 19 and the probe 20 is broken. The control box 18 is thereupon freed from probe 20 leaving the probe in the satellite nozzle. As noted hereinabove, both of locks 37 and 38 must be removed prior to use of the hand levers 33 and 34 respectively. As seen in FIG. 9, tube 60 coacts with lever 33 via cylinder 63 and lever arm 55. Once the probe 20 is removed from the control box through the chamber 58 through opening 64, the lever 33 must be re-set to again receive a probe whereby lever arm 55 pushes cylinder 63 and tube 60 to the right as seen in FIG. 9 to force ball bearing 61 downwardly into the notch 62 of the another probe.

It will be apparent from the foregoing that many other variations and modifications may be made in the structures and methods described herein without departing substantially from the essential concept of the present invention. Accordingly, it sould be clearly understood that the forms of the invention described herein and depicted in the accompanying drawings are exemplary only and are not intended as limitations in the scope of the present invention.

What is claimed is:

1. A method of capturing an orbiting spacecraft by attaching a grapple fixture carried by a probe to the spacecraft comprising the steps of inserting a probe into the opening of the rocket nozzle fo the spacecraft until a stop member on the probe contacts the spacecraft, actuating a lever and releasing a spring loaded rod which moves axially along the probe, removing a cover sleeve from the probe to expose spring loaded toggel fingers which pivot open to engage the side wall of the spacecraft forming the opening, shortening the probe and compressing the spacecraft between the toggle fingers and the step member, and engaging the grapple fixture with a retrieval means.

2. Apparatus for capturing an orbiting spacecraft comprising a grapple fixture carried by a support and stop member and which fixture is engagable by a remote manipulator arm, a probe attached to the support for insertion into an opening of the rocket nozzle of the spacecraft to be captured, an actuatable lever for releasing a spring loaded rod that moves axially along the probe, a removable cover sleeve on the probe and a plurality of spring loaded toggle fingers within the sleeve which are adapted to pivot open when the cover is removed to contact the wall of the rocket nozzle throat of the spacecraft between the toggle fingers and the stop member, thus enabling the grapple fixture to be secured to the spacecraft in order to be captured by the manipulator arm.

3. Apparatus for capturing orbiting spacecraft such as satellites and the like comprising a frame structure of rigid construction having at least a pair of extension pieces capable of being attached and detached from a manned maneuvering unit by an astronaut, the frame structure carrying a ring member that acts as a stop member with the satellite to be captured, a control box carried by the frame structure and including a set of control elements actuated by the astronaut, a probe received within the control box and being aligned substantially concentrically within the ring member, said probe including at least one toggle type finger assembly capable of moving away from the probe when actuated by one of said control elements by the astronaut and wherein the control box includes a rod that moves along the axis of the probe to release the toggle finger when the control element is activated, and wherein there is provided cover sleeve over the probe and surrounding the toggle finger to protect the finger before suth time as the finger is activated.

4. The apparatus of claim 3 wherein the control box includes means to shorten the probe and to create a compression force between said ring and a portion of the satellite when the apparatus is fixed in the capture mode.

5. The apparatus of claim 4 wherein a grapple fixture means is mounted on the frame structure in order to enable the apparatus to be recovered by a remote manipulator arm on command.

6. The apparatus of claim 3 wherein there are provided at least three of said toggle fingers of said probe, said fingers being spaced substantially equidistant about the circumference of the probe and being encased within the cover sleeve, the fingers being mounted so as to pivot away from the probe when the cover is removed.

7. The apparatus of claim 6 including first releasing means on the control box for freeing the probe from the control box.

8. The apparatus of claim 7 wherein there is provided a second releasing means on the frame structure for freeing the control box and the probe.

9. The apparatus of claim 8 including a third releasing means for freeing the frame structure, control box, probe, and ring, from the manned maneuvering unit.

10. The apparatus of claim 9 wherein each of the toggle fingers and the rod of the probe are spring biased.

11. The apparatus of claim 10 wherein the tension means to shorten the probe includes power screw means extending from the control box and with said power screw means being actuatable by a hand wheel located on one end of the control box nearest the astronaut.

12. The apparatus of claim 11 and including a torque wrench in cooperating relationship with the hand wheel for applying a predetermined amount of compression between the fingers and the satellite when the apparatus is in the capture mode.

13. The apparatus of claim 12 wherein the probe is of a size small enougth to fit within the opening of the rocket nozzle of the satellite.

14. An apparatus for capturing orbiting spacecraft such as satellites and the like comparing a frame structure of rigid construction having at least a pair of extension pieces capable of being attached and detached from a manned maneuvering unit by an astronaut, the frame structure carrying a ring member that acts as a stop member with the satellite to be captured, a control box carried by the frame structure and including a set of control elements actuated by the astronaut, a probe received within the control box and being aligned substantially concentrically within the ring member, said probe including at least one toggle type finger assembly capable of moving away from the probe when actuated by one of said control elements by the astronaut, the control box including a rod that moves along the axis of the probe to release the toggle finger when the control element is actuated, a cover sleeve over the probe and surrounding the toggle finger to protect the finger before such time as the finger is activated, the control box including means to shorten the probe and to create a compression force between said ring and a portion of the satellite when the apparatus is fixed in the capture mode, a grapple fixture means mounted on the frame structure in order to enable the apparatus to be recovered by a remote manipulator arm on command, at least three of said toggle fingers being on said probe, said fingers being spaced substantially equidistant about the circumference of the probe and being encased within the cover sleeve, the fingers being mounted so as to pivot away from the probe when the cover is removed, first releasing means on the control box for freeing the probe from the control box, a second releasing means on the frame structure for freeing the control box and the probe, a third releasing means for freeing the frame structure, control box, probe, and ring, from the manned maneuvering unit, each of the toggle fingers and the rod of the probe being spring biased, the tension means to shorten the probe including power screw means extending from the control box and with said power screw means being actuatable by a hand wheel located on one end of the control box nearest the astronaut, a torque wrench in cooperating relationship with the hand wheel for applying a predetermined amount of compression between the fingers and the satellite when the apparatus is in the capture mode, and wherein the probe is of a size small enough to fit within the opening of the rocket nozzle of the satellite.

* * * * *